UNITED STATES PATENT OFFICE.

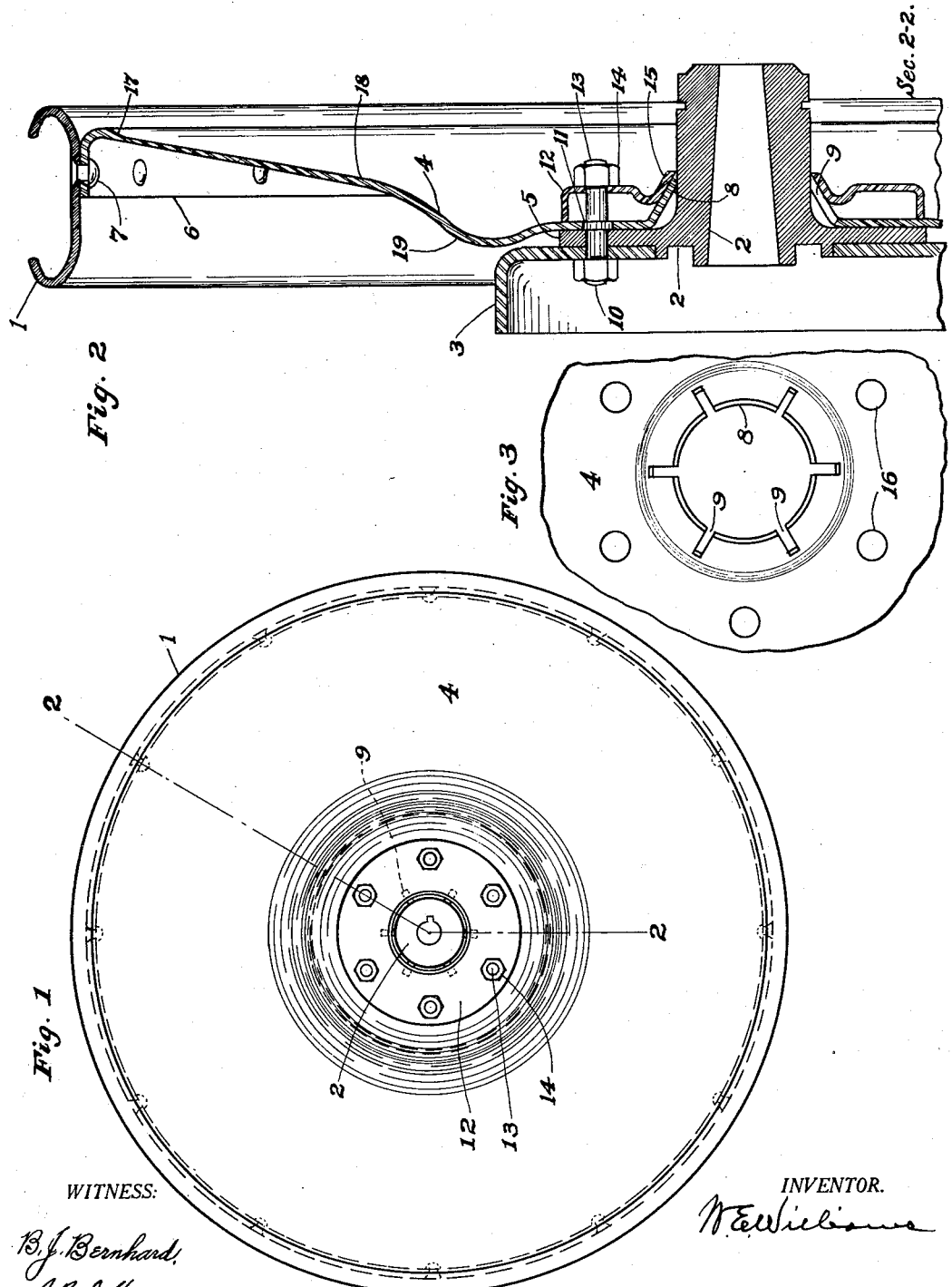

WILLIAM ERASTUS WILLIAMS, OF CHICAGO, ILLINOIS.

DISK AUTOMOBILE WHEEL.

1,405,646.  Specification of Letters Patent. Patented Feb. 7, 1922.

Application filed April 19, 1920. Serial No. 375,059.

*To all whom it may concern:*

Be it known that I, WILLIAM ERASTUS WILLIAMS, a citizen of the United States, a resident of Chicago, in the county of Cook and State of Illinois, have invented a new and useful Improvement in Disk Automobile Wheels, of which the following is a specification.

My invention relates to that class of wheels which are used primarily with pneumatic tires in which use there is occasion to demount the wheel in substituting a freshly inflated tire as well known in the art.

The object of my invention is to produce a very cheap, strong, neat and conveniently demounted disk wheel having special merits as set forth herein.

Reference will be had to the accompanying drawing in which Figure 1 is a front elevation of the wheel.

Figure 2 is a sectional elevation on a larger scale than that of Figure 1, on line 2—2 of Figure 1.

Figure 3 is an enlarged front elevational detail of the portion of the disk at the hub.

In the drawing 1 indicates the ordinary rim for a pneumatic tire wheel. 2 indicates the hub of the wheel and 3 the brake drum, in this case the rear wheel being shown. 4 indicates the disk of the wheel. 5 indicates the main hub flange which is integral with the hub.

The disk 4 is provided with an outward flange 6 which is turned over into approximately cylindrical form and pressed into the rim and secured therein by the rivets 7. The disk 4, around its central aperture where it goes over the hub 2 has an oblique flange as indicated by 8 and this flange is notched out in places as indicated by 9. The notches 9 are made simply to cut the plate for a short distance around this flange and they may be only plain shear cuts without removing any of the material.

Stud bolts 10 secure the flange 5 to the brake drum in permanent relationship through the medium of a nut on the inside of the bolt and a collar 11 on the bolt itself.

The disk 4 is secured to the flange 5 by a flange ring 12, the bolts 10 and nuts 14 thereon.

The ring 12 has a flange 15 turned thereon that presses on to the flange 8 of the disk and securely locks the said flange 8 upon the hub 2 of the wheel when the flange 12 is held firmly in place by the nuts 14. The slits 9 allow slight automatic clamping adjustment when the ring is strongly pressed inward.

In demounting the nuts 14 and ring 12 being removed, the disk is easily replaced by another. The bolts 10 have enlargements or annular flanges 11 and the disks have perforations 16 in exact registry with these enlargements, so that the disk can have no rotary movement even if not rigidly clamped.

The pressure of the nuts 14 on the flange ring 12 will draw the inner flange 15 of the said ring tightly down on to the flange 8 and thus make a tight closure, and one that may easily be released when the nuts are removed.

From a circle at 18 the disk is progressively decreased until a circle at 17, near the rim, is reached saving metal where it is least needed and increasing the thickness, without increasing weight of the whole, in the central zone and at and near the rim flange.

The disk is made saucer shape as shown, with the reentrant bulge 19 to give stiffness and a slight degree of elasticity.

The notches 9, as before described, permit a slight springing or elastic action in clamping this disk to the hub so that there will be provided a tight fit even though the hub sizes may vary slightly.

What I claim is:—

1. The combination with an approximately cylindrical hub having a circumferential flange, of an outwardly concave disk resting laterally against the hub flange and provided with an inwardly turned peripheral flange and a central flange projecting obliquely outward to meet the hub at some distance from the hub flange and having radial slits extending to its margin, and an annular clamping member arranged to bind the disk and its central flange against the hub flange and hub, respectively; said disk having thick central and peripheral portions and tapered outwardly from the inner to the outer portion.

2. The combination with a hub barrel having a circumferential flange, of an outwardly concave disk having an approximately cylindrical in-turned, rim-receiving peripheral flange and an outwardly bent flange around its central opening forming an oblique flange to rest on the hub barrel, and a clamping ring arranged to press the body of the disk against the hub flange and the oblique flange against the barrel.

3. The combination with a hub having a circumferential flange, of an outwardly concave disk having a peripheral inwardly turned rim-receiving flange and an oppositely turned oblique central flange resting against the hub, and means for clamping the disk laterally against the hub flange and radially inward against the hub body, said disk having its central and peripheral parts relatively thick and the intervening zone outwardly tapered in thickness.

4. The combination with a hub barrel, of an outwardly concave disk having a peripheral rim-receiving flange and itself bent outward near its central opening to form an oblique flange fitting the barrel, and means for clamping the disk, detachably, upon the hub, said oblique flange having its marginal portion provided with slits to permit slight adjustment in the size of the disk opening.

5. The combination with a cylindrical hub barrel having a circumferential flange, of a disk having a central opening adapting it to pass over said barrel and further having the portion near the opening slit radially, outwardly inclined, and clasping said barrel, and means for detachably clamping the disk against the hub flange and hub barrel.

6. The combination with a cylindrical hub barrel having a circumferential flange, of a disk fitting laterally against said flange at some distance from said barrel and provided with an annular flange extending obliquely from the contact area at the hub flange to the hub barrel, a ring having inturned flanges opposite said area and said annular flange, respectively, and studs passing through the hub flange, disk, and ring, detachably binding the other parts to the hub flange.

7. The combination with a hub barrel, of a dished wheel disk having a peripheral rim-receiving flange and a radially slit barrel engaging central flange turned oppositely from the peripheral flange, and means for demountably fixing the disk to the hub.

Signed at Chicago, in the county of Cook and State of Illinois, this sixteenth day of April, 1920.

WILLIAM ERASTUS WILLIAMS.

Witnesses:
B. J. BERNHARD,
F. ZOBEL.